May 20, 1952 J. MAURICE 2,597,356
DISK CLUTCH
Filed Aug. 6, 1947 2 SHEETS—SHEET 1
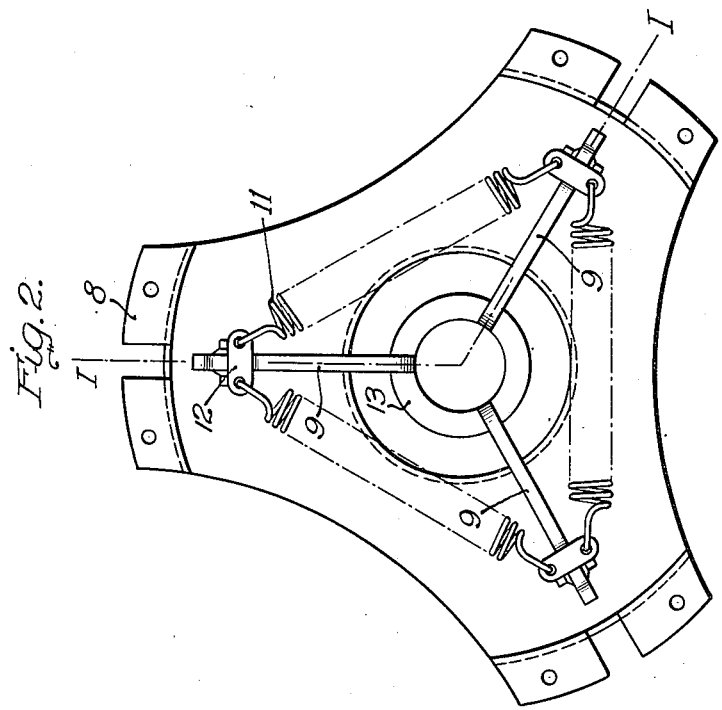
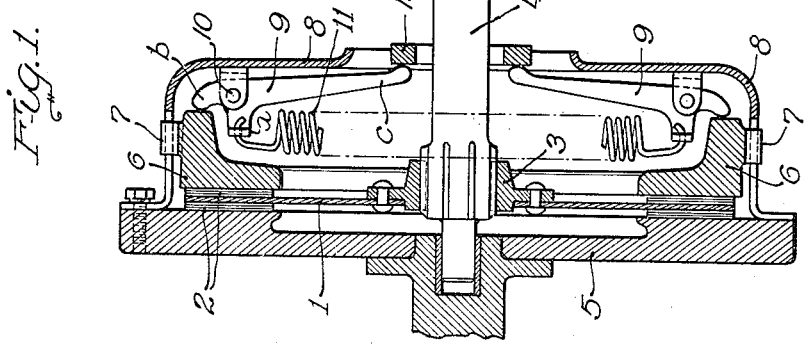
INVENTOR.
Jean Maurice
BY
E. F. Wenderoth May 20, 1952   J. MAURICE   2,597,356
DISK CLUTCH
Filed Aug. 6, 1947   2 SHEETS—SHEET 2
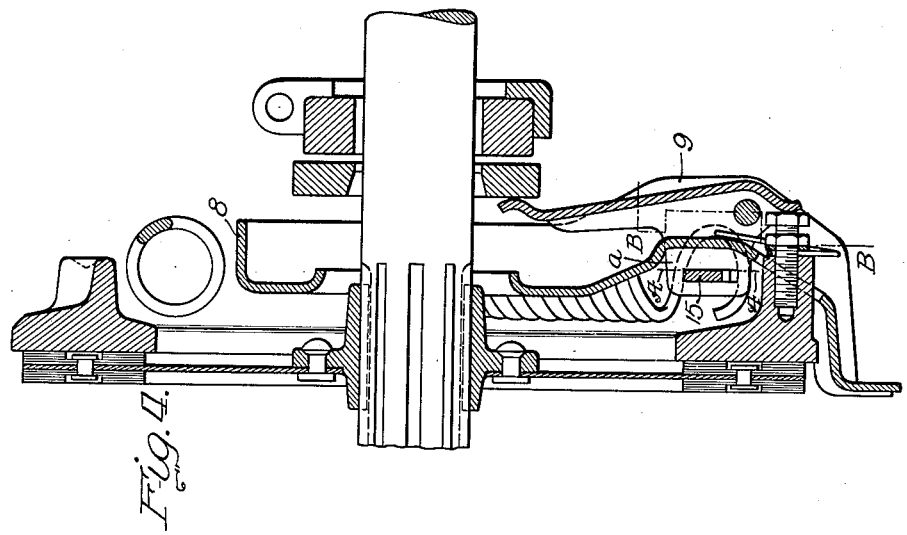
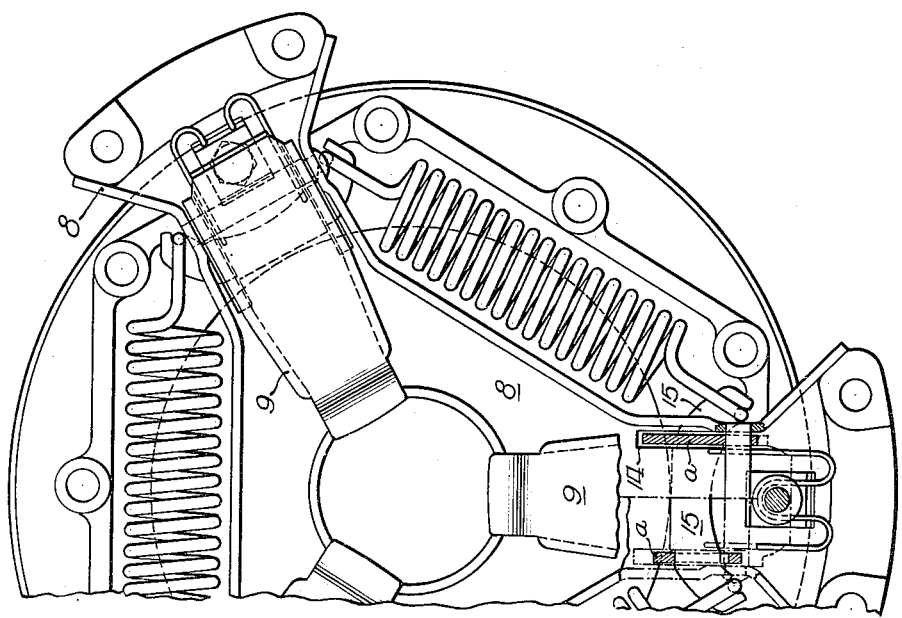
INVENTOR.
Jean Maurice Patented May 20, 1952

2,597,356

UNITED STATES PATENT OFFICE 2,597,356

DISK CLUTCH

Jean Maurice, Ablon, France, assignor to Societe Anonyme Francaise Du "Ferodo," a company of France Application August 6, 1947, Serial No. 766,627
In France February 20, 1940

Section 1, Public Law 690, August 8, 1946
Patent expires February 20, 1960

8 Claims. (Cl. 192—68)

This invention relates to disk clutches.

The present invention relates to a disk clutch mechanism which is distinguishable from known similar mechanisms by improvements which render the construction of the mechanism simpler and more economical while producing certain advantages with regard to the operation of the clutch, particularly a substantial reduction of the undesirable variation in the spring action resulting from movement of the disk-locking plate and from wear of the disks.

These advantages will be apparent from the description of a preferred embodiment of the clutch mechanism according to the invention, which is illustrated by way of example in the accompanying drawings.

Fig. 1 is a diagrammatic sectional view of the mechanism, taken on the line I—I of Fig. 2.

Fig. 2 is an elevational view of the same, with the friction disks and pressure plate omitted.

Figs. 3 and 4 are a more detailed elevational view and axial section, respectively, of one embodiment. In the lower portion of Fig. 3, partial sections have been taken on the lines A—A and B—B of Fig. 4 so as more clearly to show certain details.

The clutch illustrated, like those of the known type, comprises a disk 1 provided with friction facings 2, riveted on a splined hub 3 which drives the driven shaft 4. The disk 1 and its friction facings 2 are adapted to be clamped between the flywheel 5 secured on the driving member, and a pressure plate 6 which is axially displaceable.

The plate 6 is rotated by means of lugs 7 engaging openings formed in the housing 8 secured to the flywheel 5.

In the clutch according to the present invention, pressure is exerted upon the plate 6 by the particular device hereinafter described.

Levers 9, each having three arms $a$, $b$, $c$, are fulcrumed on pins 10 rigidly connected to the enclosing housing 8. The springs 11, which operate as tension springs, are arranged in a plane perpendicular to the axis of the clutch and act upon the ends of the arms $a$ of the levers 9 through the medium of a short cross-bar 12 the purpose of which will be pointed out presently.

One and the same spring exerts its force simultaneously upon two levers; either upon two adjacent levers, as illustrated in Figs. 1 and 2 for a clutch having three levers; or upon two opposite levers in the case of a clutch having four levers.

The load of the springs upon the arms $a$ is transmitted to the pressure plate 6 by the arms $b$.

Disengagement of the clutch is effected by exerting a force upon the ends of the arms $c$ of the levers 9 through the medium of the disengaging stop collar 13. The pressure plate is thereby set free.

A clutch constructed in this manner presents certain advantages, both from the point of view of manufacturing cost and from the point of view of operation:

(1) The arrangement of the springs in a plane perpendicular to the clutch axis makes it possible to use long springs having a large number of turns and hence great flexibility, without thereby affecting the space requirement axially of the clutch. Now this great flexibility of the springs is indispensable if excessive loads during disengagement are to be avoided and if the losses in torque transmittable by the clutch after wear on the facings are to be kept low.

This arrangement of the springs moreover has the advantage that it reduces the magnitude of the reaction forces set up at the pivotal axes of the levers.

Let $p$ represent the de-clutching pressure upon a lever, and $P$ the resultant load on the springs; then the reaction upon the axis of this lever will be $\sqrt{p^2+P^2}$, whereas it would be $p+P$ in a clutch having the springs arranged parallel to the axis.

(2) The springs, being tension springs, have the particular characteristic that they can be wound with a substantial initial tension whereby the deflection under load is decreased. This reduction in deflection makes it possible, for a given available space, to add supplementary turns, which increase the flexibility and at the same time reduce the working stresses in the wire of the spring.

(3) Since both ends of one and the same spring are each connected to a lever, both the action and reaction forces of the springs are transmitted to the levers. Thus the effective force of the springs on the pressure plate is doubled as compared with the effective force of like springs whose bearing reaction is taken up by the clutch housing (which is the arrangement employed in present-day clutches).

Moreover, this spring action can be still further increased by a step-down leverage ratio between the arms $a$ and $b$ of the levers. In this manner it is possible considerably to reduce either the load on the springs or the number of springs employed.

This arrangement increases the path of travel of the springs during operation, but the great flexibility which can be obtained makes this increased travel permissible while the de-clutching pressure and the loss in torque resulting from wear remain comparable to those of the best clutches.

(4) The reaction forces at right angles to the axis, resulting from the springs and acting upon the clutch housing, cancel each other. During clutch disengagement, the bending forces acting upon the housing are determined solely by the pressure upon the stop collar.

In the engaged condition, the reaction upon the pressure plate, transmitted to the housing through the fulcrum of the lever, has its point of application in the vicinity of the point where the housing is secured to the flywheel.

The result is a minimum bending, both for the levers and for the housing. The latter can therefore be of lighter construction.

(5) This judicious distribution of the forces acting on the housing permits the provision of large apertures in the housing, thus obtaining perfect ventilation of the pressure plate, which is favorable for heat dissipation.

(6) The springs are completely isolated from the pressure plate, which may be heated by friction to more or less high temperatures. Moreover, the springs are largely cooled by the energetic ventilation which takes place throughout the clutch.

(7) In Fig. 3 and 4, which show an embodiment of this clutch, the levers 9 are stamped in U shape. They are located outside of the clutch housing 8, and the wings forming the arms $a$ of the levers extended through openings 14 formed in the housing for that purpose. The springs are not attached directly to the wings of the levers, but are secured to a short cross-bar 15 which passes through these wings. In this manner oblique forces are avoided which would tend to deform the levers.

It will be understood that the invention is not limited to the structural details illustrated. The arrangements described are applicable particularly to multiple-disk clutches and irrespective of the number of levers used for transmitting the forces.

Likewise, the arrangement of certain members is not invariable. For example, while in Figs. 1 and 2 the housing encloses the levers and springs, these could be arranged entirely outside the housing without departing from the advantages and characteristics of the clutch of the present invention.

The use of compression springs acting on the levers at both their ends would also fall within the scope of this invention, even though this arrangement may make use of only some of the advantages enumerated above.

I claim:

1. A disk clutch comprising a disk provided with friction facings, a pressure plate having a contact face and having a circumferential portion projecting laterally therefrom at the opposite side thereof to provide a pocket, and springs lying in close proximity to and acting on said pressure plate, said springs being arranged in a plane at right angles to the clutch axis within said pocket of said pressure plate in order to permit flexibility of the springs to be increased without increasing the space requirement longitudinally of the clutch, the load of said springs being transmitted to the pressure plate through the medium of single piece pivotable levers, said springs normally maintaining pressure of said pressure plate against said disk.

2. A disk clutch according to claim 1, wherein each of said springs acts simultaneously upon two levers through the two ends of the spring, for transmitting pressure to said pressure plate, thus permitting a reduction in the size of the springs, the reaction of the springs being utilized, and thus also reducing the bending forces acting upon the clutch housing.

3. A disk clutch according to claim 1, wherein said springs are attached to levers through the medium of a cross-bar for transmitting pressure to said pressure plate thus avoiding oblique reaction forces that might tend to deform said levers.

4. In a clutch, a plurality of rotatable members, one of said members being shiftable axially of said clutch to engage a face thereof with and having a pocket formed on the other side thereof; a supporting element fixed against axial movement and connected for rotation with said axially shiftable member; single piece levers pivotally supported on said element and actuable to shift said axially shiftable member into engagement with said other member; and a spring extending between said levers and said axially shiftable member, disposed in a plane at right angles to the clutch axis within said pocket in said axially shiftable member, and connected at opposite ends thereof to said levers for actuating said levers.

5. In a clutch, a pressure plate having a contact face and having a circumferential portion projecting laterally therefrom at the opposite side thereof to provide a pocket; a driven disc engageable with said pressure plate upon axial movement of said pressure plate; a cover plate drivingly connected to said pressure plate; a plurality of single piece levers pivotally supported on said cover plate and engageable with said pressure plate to shift the latter into engagement with said driven disc; and tension springs disposed between said pressure plate and said levers within said pocket in said pressure plate in a plane at right angles to the clutch axis, each spring being connected at opposite ends thereof to two of said levers adjacent their pivotal connection to said cover plate for actuating said levers to shift said pressure plate into engagement with said driven disc.

6. In a clutch, a pressure plate having a contact face and having a circumferential portion projecting laterally therefrom at the opposite side thereof to provide a pocket, a driven disc engageable with said pressure plate upon movement of said pressure plate axially of said clutch; a cover plate connected for rotation with said pressure plate; a plurality of single piece levers, each lever being pivotally connected intermediate its ends to said cover plate and having two arms, one of which is engageable with said pressure plate; and a plurality of tension springs disposed between said levers and said pressure plate within said pocket in said pressure plate in a plane at right angles to the clutch axis, with each spring being connected at opposite ends thereof with the other of said arms of said levers for compelling rotation of said levers to actuate said one arm of each lever to effect engagement of said pressure plate with said disc.

7. In a clutch, an annular pressure plate having a friction face at one side thereof and having a circumferential portion projecting laterally therefrom at the opposite side thereof to provide a pocket, a driven disc engageable with said pressure plate upon axial movement of said pressure plate; a cover plate connected for rotation with said pressure plate, a plurality of levers pivotally connected to said cover plate and having an arm engaging said pressure plate for shifting the pressure plate into engagement with said driven disc upon pivotal movement of said levers, a plurality of tension springs within said pocket of said pressure plate, disposed in a plane at right angles to the clutch axis, and each spring being connected at opposite ends thereof to other arms of said levers for effecting pivotal movement of said levers and thereby providing pressure to the arms of said levers in engagement with said pressure plate to transfer the pressure exerted by the said springs to said pressure plate to maintain said pressure plate in engagement with said driven disc.

8. In a clutch, a pressure plate having a contact face and having a circumferential portion projecting laterally therefrom at the opposite side thereof to provide a pocket, a driven disk engageable with said pressure plate upon axial movement of said pressure plate, a cover plate connected for rotation with said pressure plate, a plurality of levers pivotally connected to said cover plate, each said lever having three arms thereon, said lever being pivoted intermediate two of said arms and in proximity to the third of said arms, a first arm of said lever engaging said pressure plate for shifting the pressure plate into engagement with said driven disk upon pivotal movement of said levers, a plurality of tension springs between said lever and said pressure plate within said pocket of said pressure plate, each spring being connected at opposite ends thereof to said intermediate arms of said levers and normally maintaining pressure between said lever and said pressure plate, and means in contact with the third arm of said levers for pivoting said levers and removing pressure therebetween and said pressure plate.

JEAN MAURICE.

REFERENCES CITED

The following references are of record in the file of this patent:

UNITED STATES PATENTS

| Number | Name | Date |
|---|---|---|
| 840,742 | Benn | Jan. 8, 1907 |
| 1,099,509 | Nelson | June 9, 1914 |
| 1,724,361 | Pearmain | Aug. 13, 1929 |
| 2,246,231 | Almen | June 17, 1941 |
| 2,250,883 | Adamson et al. | July 29, 1941 |
| 2,380,571 | Barrou | July 31, 1945 |
| 2,384,405 | Spase | Sept. 4, 1945 |

FOREIGN PATENTS

| Number | Country | Date |
|---|---|---|
| 27,814 | Austria | Mar. 11, 1907 |
| 364,253 | France | Aug. 18, 1906 |